United States Patent [19]

Sextro et al.

[11] Patent Number: 5,144,005
[45] Date of Patent: Sep. 1, 1992

[54] CONTINUOUS PROCESS FOR REMOVING UNSTABLE COMPONENTS FROM CRUDE OXYMETHYLENE COPOLYMER

[75] Inventors: Günter Sextro; Karl-Friedrich Mück; Karlheinz Burg, all of Wiesbaden; Eberhard Fischer, Kelkheim, all of Fed. Rep. of Germany

[73] Assignee: Hoechst Aktiengesellschaft, Frankfurt am Main, Fed. Rep. of Germany

[21] Appl. No.: 152,170

[22] Filed: Feb. 4, 1988

[30] Foreign Application Priority Data

Feb. 7, 1987 [DE] Fed. Rep. of Germany ....... 3703790

[51] Int. Cl.$^5$ .......................... C08G 2/10; C08G 2/28
[52] U.S. Cl. .................................. 528/480; 528/481; 528/487; 528/488; 528/489; 528/491; 528/492; 528/495; 528/499; 528/501; 525/417; 525/472
[58] Field of Search ............... 528/501, 492, 487, 488, 528/489, 491, 495, 499, 481, 480; 525/417, 472

[56] References Cited

U.S. PATENT DOCUMENTS

| | | | |
|---|---|---|---|
| 3,318,848 | 5/1967 | Clark et al. | 525/410 |
| 3,418,280 | 12/1968 | Orgen et al. | 525/410 |
| 4,431,794 | 2/1984 | Sadlowski et al. | 528/232 |
| 4,458,064 | 7/1984 | Chatterjee | 528/501 |
| 4,751,272 | 7/1988 | Okita et al. | 525/398 |
| 4,806,622 | 2/1989 | Hardy | 525/472 |
| 4,814,424 | 3/1989 | Suzumori et al. | 528/495 |
| 4,835,245 | 5/1989 | Takasa et al. | 525/472 |
| 4,946,930 | 8/1990 | Takasa et al. | 525/472 |

Primary Examiner—John Kight, III
Assistant Examiner—Rabon Sergent

[57] ABSTRACT

Continuous process for removing unstable components from crude oxymethylene copolymer, which still contains catalysts, monomeric starting materials and unstable components, by treating the copolymer with deactivators, optionally in the presence of auxiliaries, in a pressure zone, and subsequently removing volatile components in a pressure-release zone in the presence or absence of stabilizers, in which process the crude polymer is fully melted in the absence of the deactivators and auxiliaries immediately after completion of the polymerization step, and the deactivators are subsequently incorporated, alone or together with auxiliaries, under pressure into the resultant polymer melt in at least one pressure zone.

By this process, degradation is avoided and significantly better properties are obtained.

13 Claims, 1 Drawing Sheet

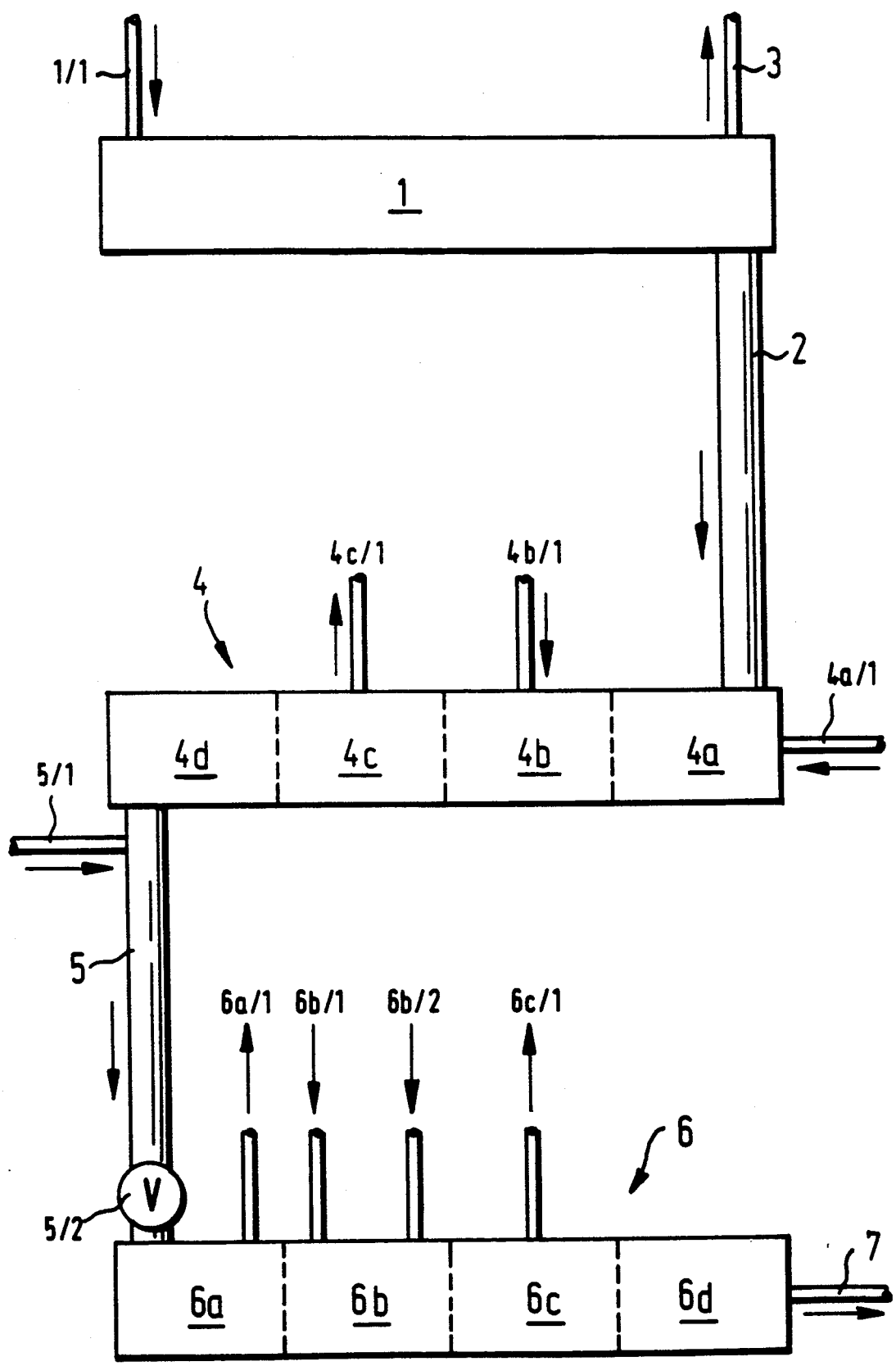

CONTINUOUS PROCESS FOR REMOVING UNSTABLE COMPONENTS FROM CRUDE OXYMETHYLENE COPOLYMER

DESCRIPTION

The invention relates to a continuous process for removing unstable components from crude oxymethylene copolymer, in which process the procedure is conducted so that, immediately after completion of the polymerization step, the crude polymer is completely melted without deactivators and auxiliaries being present and the latter only subsequently being incorporated into the polymer melt in a pressure zone.

The preparation of oxymethylene copolymers by copolymerization of formaldehyde or cyclic oligomers of formaldehyde, preferbly 1,3,5-trioxane, with suitable comonomers, such as cyclic ethers and acetals, in the presence of cationic polymerization catalysts has been disclosed (U.S. Pat. Nos. 3,027,352 and 3,803,094).

It has furthermore been disclosed that the crude oxymethylene copolymers produced in the polymerization have an inadequate thermal stability. It is therefore necessary to subject the copolymers obtained to specific treatment steps before they are processed into molded articles, filaments, films etc. by conventional shaping processes. If the cationic polymerization catalyst remains in the copolymer obtained and is not deactivated, the copolymer gradually becomes depolymerized, which causes a significant reduction in molecular weight.

The known treatment steps relate a) to deactivation of acidic catalyst components, and removal of b) unreacted monomers and c) unstable chain ends. In order to protect the polymer against heat, oxygen, light and acidic substances, suitable stabilizers are generally incorporated (d). These can be added at various points of the treatment process.

Measures (a) to (d) and the way in which they are combined are different in the various known treatment forms. The deactivation of acidic catalyst components (a) and removal of unreacted monomers (b) has been described in various processes.

The copolymerization of trioxane with cyclic ethers and acetals generally does not proceed to completion. Depending on the polymerization process and conditions, 10 to 50%, for example, of the monomers are not reacted in the reaction and remain in the polymerization aggregate, which they leave in gaseous form and/or in polymer-bound form. The removal and recovery of the unreacted monomers requires considerable time and work.

It was known to carry out the treatment of polyoxymethylenes by deactivating the catalyst used in the aqueous phase or in an organic solvent for trioxane, with subsequent filtration, washing and drying steps. This procedure was expensive since large amounts of solvent were necessary for recovery of the monomers, however, it was regarded as necessary in order to prevent excessive degradation of the polymer.

It has been described to carry out removal of the residual monomers from crude oxymethylene copolymers through treatment with an inert gas at elevated temperature (115° to 170° C.) in the presence of thermal stabilizers and/or gaseous deactivator, for example aliphatic amines. The deactivation (a), the removal of the residual monomers (b) and the incorporation of stabilizers (d) were carried out simultaneously in a single process step. It is disadvantageous in this process that it is necessary to recover the residual monomers, although not from large amounts of solvent, but instead from large amounts of carrier gas. The treatment times of 5 minutes to 8 hours, even in the preferred range of 20 minutes to one hour, require correspondingly large industrial apparatuses. Specific removal of unstable chain ends is not mentioned (U.S. Pat. No. 3,210,322).

In a similar fashion, the use of liquid solvents is avoided and the crude polymer is treated with deactivators in the gaseous phase, namely in a certain temperature range which does not cause degradation or depolymerization of the copolymers produced. In this way, melting of the copolymer is said to be avoided. In this procedure, the significance of the temperature is thus emphasized, different temperature ranges being specified for different deactivators (German Offenlegungsschrift 3,311,154).

It has also been disclosed (U.S. Pat. No. 2,989,509) that crude oxymethylene copolymers are degraded by traces of acidic catalyst in the absence of considerable amounts of trioxane, i.e. residual monomers. The process of that patent specification therefore prescribes that the deactivation (a) of the catalyst traces be carried out before removal of the residual monomers (b).

Furthermore, a process has been described (German Offenlegungsschrift 1,595,340) for removal of volatile components from polyformaldehyde, in which process the melt of the crude polymer is brought into contact under pressure with steam in conventional degassing devices, for example extruders. In Example 1 of that specification, a deactivator is added before the melting stage, while, in Example 2, the crude polymer is freed from monomers by drying in the solid state before the melt is treated with steam. Since there is no reference to the use of a deactivator in Example 2, it is assumed that considerable degradation of the polymer takes place in this process step.

It is clear from the abovementioned that the steps (a) and (b) described, both individually and also in combination, are of decisive importance for the quality of the final product.

In general, steps (a) and (b) are followed by the removal of unstable components (c). This is taken to mean both the removal of unstable chain ends by chemical reaction and their physical removal, for example by degassing. Step (c) is likewise described in some of the abovementioned applications, but, in general, no reference is made to the completeness of the step.

Specific removal of unstable components in a continuous melt process has likewise been described. In this process, the crude polymer is rapidly melted together with alkaline compounds with vigorous mixing and, in the molten state, transported to a degassing device through a zone which is under vacuum. It is regarded as the essential step in this process that the crude polymer is melted principally with the aid of mechanical energy with addition of the compounds mentioned, which deactivate the catalyst (German Auslegeschrift 1,246,244).

The addition of suitable stabilizers (d) takes place simultaneously with or subsequent to one of steps a) to c).

The abovementioned publications make clear the importance of these steps for the economic efficiency of the process and for the quality of the finished product.

Thus, depending on many individual parameters (grain size of the crude polymer, temperature, residence time, type and amount of deactivator, type and amount of catalyst, mechanical mixing etc.), a varying degree of crude polymer damage can take place, and can be recognized from, for example, an increase in the melt flow index and in unstable components. The fact that it is in some cases necessary to recover residual monomers from relatively large amounts of solvent or relatively large amounts of carrier gas also causes problems. If volatile deactivators are present, there is the additional task of separation from the residual monomers. Overall, the recovery of the reemployable residual monomers is inconvenient and uneconomic.

It was therefore desired to prepare stabilized, quantitatively and qualitatively high-grade oxymethylene copolymers by a continuous process more quickly, simply and economically than was hitherto possible in the known process.

The present invention relates to a continuous process for removing unstable components from crude trioxane copolymer which still contains catalysts, monomeric starting materials and unstable components, by treating the copolymer with deactivators in the presence or absence of auxiliaries in a pressure zone, and subsequently removing volatile components in a pressure-release zone in the presence or absence of stabilizers, in which process the crude polymer is fully melted in the absence of the deactivators and auxiliaries immediately after completion of the polymerization step, and the deactivators are subsequently incorporated, alone or together with auxiliaries, under pressure into the resultant polymer melt in at least one pressure zone.

It was surprising that it is possible to separate gaseous and solid products at the end of the polymerization reaction-combined with immediately subsequent melting of the solid product-in the absence of deactivators and auxiliaries without damage to the crude polymer. Deactivators and, if appropriate, auxiliaries are incorporated into the melt under pressure only when the product has been fully melted.

Under the action of deactivators and auxiliaries, unstable components are eliminated from the polymer and removed from the polymer melt in a subsequent pressure-release zone.

The following should be mentioned, in particular, as advantages of the type of deactivation according to the present invention:

degradation phenomena are avoided (no increase in melt flow index and in unstable components)

compared to addition of the deactivators to the copolymer before the melting step, significantly better property values are obtained, the reaction gases, such as trioxane and formaldehyde, leaving the polymerization reactor can be withdrawn and worked up separately and without contamination by deactivators and, where appropriate, auxiliaries, various simplifications to the apparatus arise; thus, the crude polymer can generally be melted directly without prior grinding, and equipment for homogeneous incorporation of the deactivators and, if appropriate, drying of the crude polymer are furthermore superfluous, for example.

The deactivators used are basic compounds, for example carbonates, hydrogen carbonates, hydroxides, phosphates and fluorides of alkali metals and alkaline-earth metals, for example sodium, potassium, magnesium or calcium, but preferably sodium, or aliphatic, aromatic or araliphatic amines. Likewise, cyanoguanidine, melamine and classes of substances which can be derived from these can likewise be employed. Mixtures of an alkali metal carbonate with an amine can also advantageously be used. Particularly suitable are tertiary amines, for example triethylamine, triethanolamine and tri-n-butylamine. In general, organic deactivators are employed in amounts between 20 and 5,000 ppm, preferably between 100 and 1,000 ppm, and inorganic compounds, for example sodium carbonate, in amounts between 1 and 100, preferably between 2 and 40 ppm, in particular between 5 and 20 ppm, in each case relative to the amount of crude oxymethylene polymer employed.

The amount of deactivator must be matched approximately to the amount of deactivating catalyst and the formic acid produced from formaldehyde by side reactions, so that an approximately neutral to slightly basic medium results. If the amounts of deactivator are too low, chain degradation can occur during the further course of the treatment, while excessive amounts can lead to discoloration. In the continuous process, the correct amount of deactivator can easily be adjusted corresponding to abovementioned criteria. Combinations of different deactivators are possible.

In general, it is advantageous to carry out the treatment of the polymer melt with deactivators and, if appropriate, auxiliaries, in a pressure zone and the subsequent removal of volatile components in a pressure-release zone, i.e. treatment under reduced pressure, a number of times, preferably alternately.

If more than one pressure zone, including the attendant pressure-release zone, is present in the process, it is advantageous, when slightly volatile or nonvolatile deactivators (for example sodium carbonate) are used, to add the majority or the total amount in the first pressure zone. In the case of volatile deactivators (for example triethylamine), it is appropriate to also add this in the subsequent pressure zones.

Suitable auxiliaries in the context of the invention are water and water-miscible alcohols, for example methanol, ethanol and the various propanols, or mixtures of these components. However, water is preferably used.

The deactivators and auxiliaries can be added to the polymer melt at separate points, but the deactivators are preferably dissolved in the auxiliary and metered in this form. The metering in takes place at the beginning of each of the pressure zones. Homogeneous mixing with the polymer melts is achieved by suitable design of the pressure zone (for example a particular screw construction in extruders).

The auxiliaries are added in amounts from 0 to 20% by weight, preferably 2 to 15% by weight, and amounts from 3 to 12% by weight are particularly favorable. The addition is preferably carried out in partial amounts, so that not more than 7% by weight, preferably 1 to 6% by weight, are metered in per pressure zone. The precentages relate to the amount of oxymethylene copolymers employed.

The temperature, pressure and residence time of the polymer melt in the various process sections can have the following conditions:

the melt temperatures are above the melting point up to a maximum of 260° C., preferably between 170° and 230° C. and in particular between 180° and 210° C., the melt pressure in the pressure zones is between 5 and 100, preferably between 20 and 50, bar and is set at least sufficiently high that no gas evolution takes place within the pressure zone, the pressure-release and degassing zones are operated at pressures between 0.001 bar and atmospheric pressure, but preferably at 0.005 to 0.5 bar and in particular at 0.01 to 0.2 bar, it being possible to use different pressures in the case of repeated degassing and it being the most effective to employ the most reduced pressure preferably at the end of the process, the residence time in the pressure zones is a total of 30 seconds to 10 minutes, preferably 1 to 6 minutes and in particular 1.5 to 4 minutes. The residence time which is necessary results from the time required for mixing in the deactivators and auxiliaries plus the time for the elimination reaction of unstable chain ends which takes place under the action of the substances.

In a preferred embodiment, at least 2, preferably 3, pressure zones are employed, which are each correspondingly followed by an attendant pressure-release or degassing zone. It is advisable that individual residence times in the pressure zones do not fall below about 5 seconds and the longest residence times be chosen at the points where the largest amounts of auxiliaries are metered in. In general, this will be the 2nd zone in the case of 2 or 3 pressure zones.

The discharge of the process according to the present invention is likewise designed as a pressure zone—but without a subsequent pressure-release or degassing zone—and is known as the discharge zone in order to differentiate from the abovementioned pressure zones having a subsequent degassing zone.

The addition of stabilizers against degradation caused by light, heat, oxidation and acidolysis, and the addition of other additives, can take place at various points of the process. Whereas antioxidants—if appropriate in partial amounts—can already be added to the monomer mixture employed for the polymerization or, alternatively at any other point of the process, other stabilizer components and other additives are preferably added after removal of the majority of the unstable components from the polymer melt, i.e., in particular, into the pressure zone before the final degassing zone or into the discharge zone itself, it being necessary to ensure adequate homogenization of the additives by choosing suitable shear conditions (for example by an appropriate screw construction).

The total duration of the process according to the invention is 1 to 30 minutes, preferably 2 to 10 minutes, and in particular 3 to 7 minutes, relative to the time span between melting the crude polymer and exit of the melt from the discharge part.

BRIEF DESCRIPTION OF THE DRAWING

The process is represented schematically in the drawing and described below in detail.

The polymerization reaction is carried out by processes which are conventional for acetal copolymers in single-or multi-screw extruders, compounders or in mixers, flat chamber molds etc. The polymerization reaction proceeds in a reactor (1) at melt temperatures above 65° C., preferably between 70° and 125° C., in particular between 80° and 115° C. The liquid monomer/catalyst mixture solidifies during the polymerization to give a hard material which leaves the polymerization vessel via a shoot (2) in the form of particles of a diameter up to about 3 cm, but preferably less than 1 cm. The gaseous reaction products produced and the residual monomers, mainly formaldehyde and trioxane, leave the polymerization vessel through a vapor line (3) and are fed to a separate treatment step.

It is possible to use an inert carrier gas for transporting the residual monomer gases out of the polymerization reactor, but the process can also be carried out without carrier gas. Deposit formation in (3) due to residual monomers can be prevented by suitable temperature control and/or by adding steam.

The crude polymer leaving the polymerization reactor falls, without interim storage, into a melt unit (4). Single-or multi-screw extruders or disk reactors, for example, can be used for this purpose. A twin-screw extruder is shown in the figure.

The melting takes place in a first compression and pressure zone (4a) in the absence of deactivators and/or auxiliaries and preferably in the absence of atmospheric oxygen. The time span between leaving the polymer unit and reaching the homogeneous melt state is 3 to 30 seconds, preferably 5 to 20 seconds. Deactivators and, if appropriate, auxiliaries are then injected under pressure in an addition zone (4b) into the homogeneous melt which is present.

The melt is freed from volatile components in a downstream degassing zone (4c) and can be granulated directly, if appropriate after conventional stabilizers have been mixed in and after it has passed through a discharge zone.

In a preferred embodiment which is represented in the figure, the pressure-release zone (4c) is followed by a further pressure zone, in which deactivators and auxiliaries can again be mixed in. This pressure zone is formed from the rear section (4d) of the twin-screw extruder (4) and a pipeline which is designed as a static mixer (5) and which is connected to a downstream degassing unit (6) via a butterfly valve (5/2).

The design of the pressure zones in not crucial so long as the deactivators and auxiliaries to be incorporated are adequately mixed and the process conditions temperature, pressure, time and, preferably, those of a narrow residence-time spectrum are maintained. Single- and multi-screw extruders, preferably twin-screw extruders, and static mixers are highly suitable.

The pressure-release and degassing steps can be carried out in single- and multi-screw extruders, in flash chambers (strand degassing), thin-film evaporators or disk reactors. The same units are also suitable for the incorporation of stabilizers and additives.

The various process steps (reaction, melting, incorporation of deactivators and auxiliaries, degassing, incorporation of stabilizers etc.) can be carried out in several successive units. The units can be of the same type or alternatively different, possible combinations being, for example, Twin-screw extruder/twin-screw extruder Twin-screw extruder/static mixer/thin-film evaporator Single-screw extruder/static mixer/flash chamber.

Of course, it is also possible to carry out all process steps, for example, in only one unit (for example a twin-screw extruder) or in a combination of more than three units connected together.

In the present embodiment, a twin-screw extruder (6) is drawn in the figure. The construction of the extruder ensures effective degassing in the pressure-release zone (6a); this is followed by a compression and pressure zone (6b), in which stabilizers and/or further additives and deactivators are metered in. This is followed by a final pressure-release (6c), followed by the compression and discharge part (6d) of the extruder with a subsequent strand withdrawal and cutting device.

Oxymethylene polymers are taken to mean, in general, poly(oxymethylenes) which, in the main valence chain, contain 0.1 to 20, preferably 0.5 to 10, percent by weight of oxyalkylene units having 2 to 8, preferably 2, 3 or 4 neighboring carbon atoms, in addition to oxymethylene units, oxymethylene polymers whose proportion of oxyalkylene units is 1 to 5 percent by weight being particularly suitable.

The oxymethylene polymers are prepared by bulk polymerization of the monomers in the presence of cationically active catalysts (cf., for example, U.S. Pat. No. 3,027,352). In this process, the cationically active catalysts used are (1) Protonic acids, for example perchloric acid and trifluoromethanesulfonic acid
(2) Esters of protonic acid, in particular esters with lower aliphatic alcohols, for example tert-butyl perchlorate,
(3) Anhydrides of protonic acids, in particular mixed anhydrides of protonic acids with lower aliphatic carboxylic acids, for example acetyl perchlorate,
(4) Lewis acids, in particular halides of boron, tin, titanium, phosphorus, arsenic and antimony, for example boron trifluoride, tin tetrachloride, titanium tetrachloride, phosphorus pentachloride, phosphorus pentafluoride, arsenic pentafluoride and antimony pentafluoride, and
(5) Complex compounds or salt-containing compounds, preferably etherates or onium salts of Lewis acids, for example boron trifluoride diethyl etherate, boron trifluoride di-n-butyl etherate, triethyloxonium tetrafluoroborate, trimethyloxonium hexafluorophosphate, triphenylmethylhexafluoroarsenate, acetyl tetrafluoroborate, acetyl hexafluorophosphate and acetyl hexafluoroarsenate.

The amount of catalysts employed in the copolymerization depends, above all, on the strength of their activity; in general, the catalysts are used in an amount by weight of 0.1 to 2,000, preferably 0.2 to 500, ppm, relative to the total amount of the compounds to be polymerized. Highly effective catalysts such as boron trifluoride are expediently employed in an amount by weight of 10 to 150, preferably 20 to 100, ppm, relative to the total amount of the compounds to be polymerized. For complex compounds or salt-like compounds of the catalysts mentioned, the corresponding molar amounts apply. Very highly effective catalysts such as perchloric acid and trifluoromethane sulfonic acid are used in an amount from 0.1 to 10, preferably 0.2 to 5, ppm.

In general, it is advisable to employ the catalysts in dilute form. Gaseous catalysts are generally diluted with an inert gas, for example nitrogen and noble gases such as argon, whereas liquid or solid catalysts are dissolved in an inert solvent. Suitable solvents are, in particular, aliphatic or cycloaliphatic hydrocarbons and nitrated aliphatic or aromatic hydrocarbons. Examples which may be mentioned are: cyclohexane, methylene chloride, ethylene chloride, nitromethane, nitrobenzene, ethylene carbonate and diethylene glycol dimethyl ether. The catalyst: diluent weight ratio is usually 1:5 to 1:10,000, preferably 1:10 to 1:100. Very highly effective catalysts are expediently diluted in the ratio from 1:5,000 to 1:20,000.

The polymerization process is preferably carried out under an inert gas atmosphere and with exclusion of moisture; suitable inert gases are preferably noble gases, for example argon, and nitrogen.

Suitable compounds which can be copolymerized with trioxane are, above all, a) cyclic ethers having 3, 4 or 5 ring members, preferably epoxides, b) cyclic acetals, preferably formals, having 5 to 11, preferably 5 to 8, ring members, and c) linear polyacetals, preferably polyformals.

Suitable copolymers for trioxane are particularly compounds of the formula

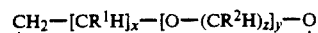

in which (A) $R^1$ and $R^2$ are identical or different and each denotes a hydrogen atom, an aliphatic alkyl radical having 1 to 6, preferably 1 to 4, carbon atoms, or a phenyl radical, and (a) x is 1, 2 or 3 and y is zero, or (b) x is zero, y is 1, 2 or 3 and z is 2, or (c) x is zero, y is 1 and z is 3 to 6, or (B) $R^1$ denotes an alkoxymethyl radical having 2 to 6, preferably 2 to 4, carbon atoms, or a phenoxymethyl radical, x being 1 and y being zero and $R^2$ having the abovementioned meaning.

The cyclic ethers employed are, for example, ethylene oxide, propylene oxide, styrene oxide, cyclohexene oxide, oxacyclobutane and phenyl glycidyl ether, while the cyclic formals used are, for example, 1,3-dioxolane, 1,3-dioxane, 1,3-dioxepane and 1,3,6-trioxocane, and also 4-methyl-1,3-dioxolane, 4-phenyl-1,3-dioxolane, 1,3-dioxonane and 1,3-dioxo-5-cycloheptane. Suitable linear polyformals are, above all, poly(1,3-dioxolane) and poly(1,3-dioxepane).

For the preparation of oxymethylene polymers having certain molecular weight ranges, it is expedient to carry out the polymerization in the presence of a regular. Suitable for this purpose are, above all, formaldehyde dialkyl acetals having 3 to 9, preferably 3 to 5, carbon atoms, for example formaldehyde dimethyl acetal, diethyl acetal, dipropyl acetal and dibutyl acetal, and also lower aliphatic alcohols, preferably alkanols having 1 to 4 carbon atoms, for example methanol, ethanol and various propanols and butanols. The regulator is usually employed in an amount up to 0.5 percent by weight, preferably from 0.005 to 0.1 percent by weight, relative to the total amount of the compounds to be polymerized.

The oxymethylene copolymers obtained by the process according to the present invention are macromolecular; their reduced specific viscosity (RSV) values are 0.25 to 2.0, preferably 0.5 to 1.5, dl/g (measured at a temperature of 140° C. on a 0.5 percent strength by weight solution of the copolymer in γ-butyrolactone containing 2 percent by weight of diphenylamine as stabilizer). The crystallite melting points of the oxymethylene copolymers are in the range from 140° to 180° C., and their melt flow indices (MFI) are 0.1 to 60, preferably 1 to 30, g/10 min (measured in accordance with DIN 53 735 at a temperature of 190° C. and a load of 2.16 kg).

The oxymethylene copolymers obtained can additionally be stabilized by homogeneously mixing them, as described, with stabilizers against the influence of heat, oxygen and/or light. The amount of the added stabilizers is in total 0.1 to 10, preferably 0.5 to 5, percent by weight, relative to the total mixture.

Suitable stabilizers are, above all, bisphenol compounds, alkaline-earth metal salts of carboxylic acids, and guanidine compounds. The bisphenol compounds used are primarily esters of monobasic 4-hydroxyphenylalkanoic acids which contain 7 to 13, preferably 7 to 9, carbon atoms and which are monosubstituted or disubstituted in the ring by an alkyl radical having 1 to 4 carbon atoms, with aliphatic dihydric, trihydric or tetrahydric alcohols which contain 2 to 6, preferably 2 to 4, carbon atoms, for example esters of ω-(3-tert.-butyl)-4-hydroxyphenyl)-pentanoic acid, β-(3-methyl-5-tert.-butyl-4-hydroxyphenyl)-propionic acid, (3,5-di-tert.-butyl-4-hydroxyphenyl)-acetic acid, β-(3,5-di-tert.-butyl-4-hydroxyphenyl)-propionic acid or (3,5-di-isopropyl-4-hydroxyphenyl)-acetic acid with ethylene glycol, 1,2-propanediol, 1,3-propanediol, 1,4-butanediol, 1,6-hexanediol, 1,1,1-trimethylolethane or pentaerythritol, or 3-(3-tert.-butyl-4-hydroxy-5-methyl-phenyl)-propionic acid with triethylene glycol.

The alkaline earth metal salts of carboxylic acids used are, in particular, alkaline-earth metal salts of aliphatic monobasic, dibasic or tribasic carboxylic acids having 2 to 20, preferably 3 to 9, carbon atoms and preferably containing hydroxyl groups, for example the calcium or magnesium salts of stearic acid, ricinoleic acid, lactic acid, mandelic acid, malic acid, citric acid or propionic acid.

The guanidine compounds used are compounds of the formula

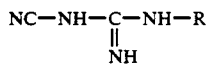

in which R denotes a hydrogen atom, a cyano group or an alkyl radical having 1 to 6 carbon atoms, for example cyanoguanidine, N-cyano-N'-methylguanidine, N-cyano-N'-ethylguanidine, N-cyano-N'-propylguanidine, N-cyano-N'-tert.-butylguanidine or N,N'-dicyanoguanidine.

The guanidine compound is, where appropriate, employed in an amount from 0.01 to 1, preferably 0.1 to 0.5, percent by weight, relative to the total mixture.

The use of polyamides as additional stabilizing components is also possible in amounts from 0.02 to 1, preferably 0.03 to 0.5 percent by weight, likewise relative to the total mixture.

Furthermore, other conventional additives, for example known light stabilizers, such as benzophenone, acetophenone or triazine derivatives, dyes, pigments, reinforcing materials and fillers, can likewise be added to the oxymethylene copolymers prepared according to the invention.

The oxymethylene copolymers obtained according to the invention can be processed by all processes which are conventional for thermoplastics, for example by injection molding, extrusion, extrusion blow molding, melt spinning and thermoforming. They are suitable as materials for the production of semi-finished products and finished articles, such as moldings, for example bars, rods, sheets, tapes, bristles, filaments, fibers, films, foils, pipes and tubes, and also household articles, for example bowls and cups, and machine parts, for example housings and gear wheels. Above all, they can be used as qualitatively high-grade industrial materials for the production of dimensionally stable and size retaining molded articles whose surface is smooth and free of streaks.

EXAMPLES

(1), (2) and Comparison 26 kg/h of a trioxane/dioxolane mixture containing 3.4% by weight of dioxolane together with 232 ppm of $BF_3$ n-dibutyl etherate (=80 ppm of $BF_3$)—dissolved in 80 times the amount of cyclohexane—were introduced (1/1) into a polymerization reactor (1) and polymerized at about 100° C. The yield of crude polymer was 19.5 kg/h=75%. The unpolymerized trioxane and the formaldehyde formed were removed under suction at position (3) and adsorbed in a water circuit. The hourly increase in formaldehyde components was 6.0 kg. The crude copolymer, in unground form, was metered into a twin-screw extruder (4) via a downpipe (2) and melted at 190° C. (4a). A homogeneous mixture of auxiliary and deactivator (2% by weight of water/1000 ppm of triethylamine/10 ppm of soda; amounts relative to the crude copolymer) was metered in upstream of the melt (4a/1, comparison example) or into the melt (4b/1, according to the present invention). In the degassing section of the extruder (4c, about 0.5 kg/h of formaldehyde derivatives were removed under reduced pressure at position (4c/1). From the extruder outlet (4d), the melt proceeded directly into a static mixer (5), and was mixed at the mixing tube inlet (5/1) with 1.17 kg/h of a mixture of 99 parts by weight of water and 1 part by weight of triethylamine (corresponding to 600 ppm of amine, relative to the amount of crude polymer). The residence time in the mixing tube was 2.5 minutes. The melt proceeded via a butterfly valve (5/2) into the twin-screw extruder (6). The screws rotated in the same direction, and the L/D ratio is 30. The pressure-release zone (6a) was kept at 0.1 bar, gaseous auxiliaries, deactivators and elimination products being removed at position (6a/1). 0.50 kg/h of a molten mixture of 0.4 parts by weight of (®)Irganox 245 (antioxidant, manufacturer Ciba-Geigy AG; Basel/Switzerland), 0.1 part by weight of tricalcium citrate, 0.02 part by weight of calcium propionate and 0.02 part by weight of dicyandiamide together with 2 parts by weight of a thermostabilized acetal copolymer, for example the acetal copolymer which is obtained according to the present invention, was introduced into the subsequent pressure zone (6b) at position (6b/1) via a small extruder under pressure. 0.59 kg/h of a water/triethylamine mixture of the abovementioned composition was added at position (6b/2). A reduced pressure of 0.02 bar was maintained in zone (6c), and the gaseous products were removed at position (6c/1) as at (6a/1). After passing through the discharge zone (6d), the melt strand exited from (7) and, after cooling in a waterbath, was cut into granules and dried. In Example 2, the amount of polymerization catalyst employed was 40 ppm of $BF_3$.

Unless otherwise stated, the melt temperature in the various process sections was 185° C.

TABLE

| Example | Deactivator/auxiliary addition | Proportion of $BF_3$, ppm | MFI g/10 min | Hydrolysable component, % | Thermo stab.*) | Yellowing**) |
|---|---|---|---|---|---|---|
| 1 | into the melt | 80 | 6.4 | 0.74 | 0.37 | +1.4 |
| 2 | into the melt | 40 | 5.3 | 0.53 | 0.19 | −0.5 |

TABLE-continued

| Example | Deactivator/auxiliary addition | Proportion of BF$_3$, ppm | MFI g/10 min | Hydrolysable component, % | Thermo stab.*) | Yellowing**) |
|---|---|---|---|---|---|---|
| Comparison | before the melt | 80 | 8.6 | 1.12 | 0.86 | +3.0 |

*)Weight loss over 60 minutes at 240° C. under nitrogen
**)In accordance with DIN 6167

The "hydrolyzable component" is the unstable end groups in the polymers and unstable polymers. These components were determined as follows:

1 g of the copolymer was added to 100 ml of 50% strength aqueous methanol containing 0.5% of ammonia. The mixture obtained was heated in a closed vessel for 45 minutes at 180° C. in order to dissolve the copolymer. The formaldehyde produced, which dissolves in the solution, was analysed quantitatively and given in % by weight, relative to the polymer employed.

The advantages of the process according to the invention are shown by the values obtained in Examples 1 and 2 compared to the comparison. The melt flow index in Examples 1 and 2 is lower than in the comparison, i.e. degradation in these examples is significantly less, which is also expressed—in parallel to this—by the reduced values for the hydrolysable components. In addition, the oxymethylene copolymers obtained in accordance with Examples 1 and 2 exhibit considerably better thermostability and yellowing values.

We claim:

1. In a continuous process for catalytically co-polymerizing trioxane with co-monomers, then adding reactants including catalyst deactivator and stabilizer to the crude co-polymer, the improvement according to which the co-polymerization is conducted in a co-polymerization zone at a temperature between 70° C. and 125° C., gaseous co-polymerization products are separated from the crude co-polymerizate discharged from the co-polymerization zone, the crude co-polymerizate discharge from the co-polymerization zone is completely melted within about 30 seconds after the discharge, the added reactants are not added until after the complete melting, and the co-polymer is maintained above its melting point but not over 260° C. throughout such addition.

2. A continuous process for removing unstable components from crude catalytically prepared oxymethylene copolymer that still contains polymerization catalyst, monomeric starting materials and unstable components, which process comprises preparing said crude copolymer as a solid by bulk catalytic polymerization of trioxane with comonomers in a polymerization unit at a temperature above 65° C., discharging the crude polymerizate, separating the resulting crude solid copolymer and trioxane/formaldehyde gases from one another immediately after leaving the polymerization unit, immediately melting in a pressure zone the crude solid copolymer leaving the polymerization unit without interim storage and in the absence of any material which deactivates the polymerization catalyst, treating the melted copolymer with a catalyst deactivator composition under pressure in at least one subsequent pressure zone, removing volatile components in at least one pressure-release zone in the presence or absence of a co-polymer stabilizer, and discharging the degassed copolymer, the copolymer melt being kept at a temperature above its melting point up to a maximum of 260° C.

3. A process as claimed in claim 2 wherein the melting and subsequent treatments are carried out in a single- or multi-screw extruder or in a disk reactor or in combinations thereof.

4. A continuous process for removing unstable components from crude solid oxymethylene copolymer prepared by polymerization of trioxane with at least one comonomer at a temperature above 65° C. in a polymerization unit, which copolymer still contains catalysts, monomeric starting materials and unstable components, which process comprises separating the resulting solid crude copolymer and trioxane/formaldehyde gases from one another immediately after leaving the polymerization unit, the gaseous component is fed to a separate treatment stage, the crude copolymer is fully melted in a first pressure zone, in the absence of catalyst deactivator and auxiliary agent, immediately after completion of the polymerization step, the deactivator is subsequently incorporated, alone or together with an auxiliary, under pressure into the resultant copolymer melt in at least one subsequent pressure zone, removing volatile components from the melted copolymer in a pressure-release zone in the presence or absence of a stabilizer, the copolymer melt is kept at a temperature above its melting point up to a maximum of 260° C., and the melting, deactivation and thermal treatment are carried out in a single- or multi-screw extruder or in a disk reactor.

5. A continuous process for removing unstable components from crude solid oxymethylene copolymer produced by the polymerization of trioxane monomer with at least one comonomer in the presence of a catalyst in a polymerization unit, said process comprising separating the crude solid copolymer from any unreacted monomer and by-products immediately after removing said copolymer from the polymerization unit, transporting said removed copolymer into a melt unit where it is melted into the liquid phase, in the absence of any material which deactivates the polymerization catalyst, and subsequently adding to the melted copolymer a basic deactivator for the polymerization catalyst.

6. The process of claim 5 wherein the deactivator is an amine, phosphate, hydroxide, fluoride or carbonate of an alkali metal or an alkaline-earth metal.

7. A continuous process for removing unstable components from crude solid oxymethylene copolymer produced by the polymerization of trioxane monomer with at least one comonomer in the presence of a catalyst in a polymerization unit, said process comprising separating the crude solid copolymer from any unreacted monomer and by-products immediately after removing said copolymer from the polymerization unit, transporting said removed copolymer into a melt unit where it is melted into the liquid phase, in the absence of any material which deactivates the polymerization catalyst, and subsequently adding to the melted copolymer an organic deactivator for the polymerization catalyst in an amount from 20 to 5000 ppm relative to the amount of crude oxymethylene copolymer.

8. A continuous process for removing unstable components from crude solid oxymethylene copolymer produced by the polymerization of trioxane monomer with at least one comonomer in the presence of a catalyst in a polymerization unit, said process comprising separating the crude solid copolymer from any unreacted monomer and by-products immediately after removing said copolymer from the polymerization unit, transporting said removed copolymer into a melt unit where it is melted into the liquid phase, in the absence of any material which deactivates the polymerization catalyst, and subsequently adding to the melted copolymer an inorganic deactivator for the polymerization catalyst in an amount from 1 to 100 ppm relative to the amount of crude oxymethylene copolymer.

9. A continuous process for removing unstable components from crude solid oxymethylene copolymer produced by the polymerization of trioxane monomer with at least one comonomer in the presence of a catalyst in a polymerization unit, said process comprising separating the crude solid copolymer from any unreacted monomer and by-products immediately after removing said copolymer from the polymerization unit, transporting said removed copolymer into a melt unit where it is melted into the liquid phase in the absence of any material which deactivates the polymerization catalyst, and subsequently adding to the melted copolymer a deactivator for the polymerization catalyst and an auxiliary agent for removing the copolymer from the associated ingredients.

10. The process of claim 9 in which the auxiliary agent comprises water, water-dilutable alcohol, or a mixture thereof.

11. The process of claim 9 in which the auxiliary agent is added in an amount from 2 to 15% by weight relative to the amount of copolymer.

12. A continuous process for removing unstable components from crude solid oxymethylene copolymer produced by the polymerization of trioxane monomer with at least one comonomer in the presence of a catalyst in a polymerization unit, said process comprising separating the crude solid copolymer from any unreacted monomer and by-products immediately after removing said copolymer from the polymerization unit, transporting said removed copolymer into a melt unit where it is melted into the liquid phase in the absence of any material which deactivates the polymerization catalyst, subsequently adding to the melted copolymer, a deactivator for the polymerization and further treating the copolymer melt at a pressure between 0.001 bar and atmospheric pressure to remove volatile degradation products.

13. The process as claimed in claim 12, wherein the pressure is 0.005 to 0.5 bar.

* * * * *